T. PETERSEN.
DEFLATED TIRE CIRCUIT CLOSER.
APPLICATION FILED DEC. 20, 1918.
1,323,547.
Patented Dec. 2, 1919.
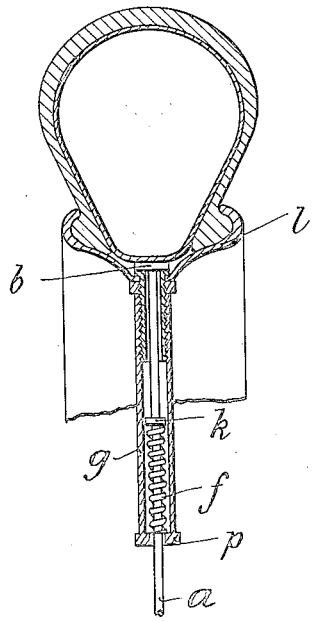
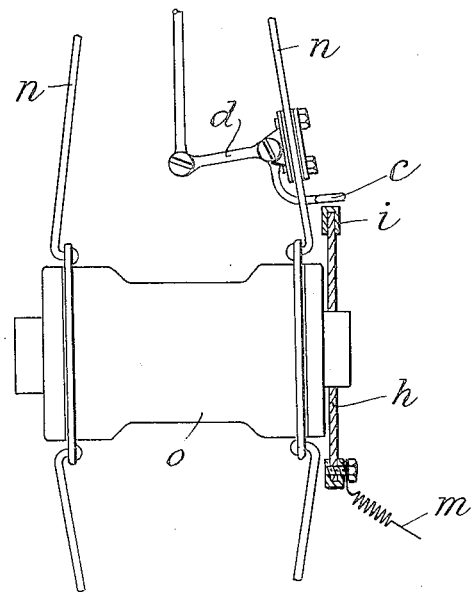
INVENTOR:
Theodor Petersen
By Wm Wallace White
ATTY

UNITED STATES PATENT OFFICE.

THEODOR PETERSEN, OF COPENHAGEN, DENMARK.

DEFLATED-TIRE CIRCUIT-CLOSER.

1,323,547.  Specification of Letters Patent.  Patented Dec. 2, 1919.

Application filed December 20, 1918. Serial No. 267,590.

*To all whom it may concern:*

Be it known that I, THEODOR PETERSEN, erector, a subject of the King of Denmark, residing at Copenhagen, in the Kingdom of Denmark, have invented new and useful Improvements in Deflated-Tire Circuit-Closers, of which the following is a specification.

The invention relates to an arrangement in motor bicycles, motor carriages or similar vehicles, adapted to prevent accidents caused by punctures of or other damage to the pneumatic tires of the vehicle.

The invention is illustrated on the drawing, showing a vertical section of a portion of a bicycle wheel. $a$ is a rod provided in the central plane of the wheel, between the spokes, one end of the rod passing through the wheel felly $l$ and carrying, beyond the latter, a disk $b$. The opposite end of the rod is connected to a bell-crank lever $d$ pivoted to the spokes $n$ near the wheel hub $o$ and supporting, on its free arm, a contact piece $c$. $g$ is a tubular sleeve fastened to the felly $l$ and encircling and guiding the rod $a$. $f$ is a helical spring encircling the rod $a$ between a shoulder $k$ on the same and the cover $p$ of the sleeve $g$. $h$ is a circular disk of insulating material fitted, at its circumference, with a metallic ring $i$. The disk is fastened either to the wheel axle proper or to the frame supporting the same. From the metal ring $i$, a conductive wire $m$ runs to the current source of the ignition device.

The apparatus acts in the following manner:

In case the air escapes from the inner tube, owing either to punctures or ruptures, so that it cannot any longer exert a pressure against the disk $b$, the helical spring $f$ will push the inner tube outward, so that the bell-crank $d$ is turned and its contact piece $c$ comes into contact with the metal ring $i$ on the disk $h$, whereby the electric ignition is short-circuited and discontinued, so that explosions in the motor are rendered impossible. When the tire is again inflated, the inner tube presses the disk $b$ against the rim, and the rod $a$ returns the lever $d$ to its normal position, whereby the contact piece $c$ is carried away from the ring $i$, where after the ignition is free to act again.

When the motor, by means of the apparatus, is set out of operation, it will act as a brake for the vehicle, and the driver needs only to keep the vehicle running straight, until it stops by itself.

The apparatus may be adjusted so that it acts for minor punctures occurring by which the air slowly leaves the inner tube, the ignition being interrupted when the air-pressure in the tube has sunk below a certain pressure. The moment when the apparatus enters into action may be varied by adjustment of the angle through which the bell-crank $d$ is turned. This may be done by fastening the bell-crank to the spokes at a slightly larger or smaller distance from the circumference of the disk $h$, or by the rod $a$ being shortened or lengthened, or by the tension of the helical spring $f$ being varied by screwing the sleeve $g$ out or in. It is hereby avoided to drive with insufficient air in the tire and thereby, perhaps, to damage the outer or inner tube.

The parts of the apparatus are not exposed to wear, except at the moment when the motor is to be stopped.

Having now particularly described and ascertained the nature of my said invention and in what manner the same is to be performed, I declare that what I claim is:—

In combination a wheel, an axle, a sleeve secured to the felly of said wheel, a rod slidable in said sleeve and having its outer end formed with a disk adapted to contact with the inner tube of a tire, means for biasing the rod outwardly, a bell crank lever pivoted to a spoke of said wheel and adjustable thereon, said lever having one end thereof pivoted to the inner end of said rod, a disk formed of insulating material fixed to said axle, a metallic ring secured to the periphery of said disk, and a contact piece formed on the remaining end of said bell crank lever and adapted to contact with said ring.

In testimony whereof I affix my signature in presence of two witnesses.

THEODOR PETERSEN.

Witnesses:
 V. BELSELMER,
 E. W. EILSKOW.